(12) United States Patent
Hinderer et al.

(10) Patent No.: US 8,136,652 B2
(45) Date of Patent: Mar. 20, 2012

(54) PROCESSING STATION FOR A PROCESSING LINE HAVING A MODULE PLATFORM AND WITHDRAWABLE MODULES THAT CAN BE INTRODUCED INTO THE MODULE PLATFORM

(75) Inventors: Karl Hinderer, Fichtenberg (DE); Paul Skljarow, Schwieberdingen (DE); Wolfram Baier, Ostfildern (DE); Karl-Heinz Jaeger, Baunach (DE); Stefan Pfeiffer, Bamberg (DE); Frank Westphal, Vaihingen-Enz (DE); Joachim Frangen, Heilbronn (DE); Peter Schlaich, Leonberg (DE); Frank Benkert, Bad Brückenau-Volkers (DE); Ka-Jin Teoh, Essen (DE); Boris Buesing, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 764 days.

(21) Appl. No.: 12/159,337

(22) PCT Filed: Dec. 20, 2006

(86) PCT No.: PCT/DE2006/002286
§ 371 (c)(1),
(2), (4) Date: Jun. 26, 2008

(87) PCT Pub. No.: WO2007/079710
PCT Pub. Date: Jul. 19, 2007

(65) Prior Publication Data
US 2009/0010739 A1    Jan. 8, 2009

(30) Foreign Application Priority Data

Jan. 16, 2006  (DE) .......................... 10 2006 002 082

(51) Int. Cl.
B23P 21/00 (2006.01)
B65G 37/00 (2006.01)
B65G 47/00 (2006.01)

(52) U.S. Cl. ................... 198/468.01; 198/349; 198/580; 198/465.2; 198/465.1; 198/345.3; 198/346.1; 414/222.06; 414/222.07

(58) Field of Classification Search ........................ None
See application file for complete search history.

(56) References Cited

U.S. PATENT DOCUMENTS
4,519,491 A    5/1985   Prodel et al.

FOREIGN PATENT DOCUMENTS
DE    197 41 671    7/1998
DE    197 29 369    1/1999
(Continued)

*Primary Examiner* — Gene Crawford
*Assistant Examiner* — Yolanda Cumbess
(74) *Attorney, Agent, or Firm* — Michael J. Striker (57) ABSTRACT

A processing station for a processing line, having a module platform (12) and a plurality of withdrawable modules (14) that can be introduced into it has a transporting device (40, 42) for transporting workpieces (59) to be processed at the processing station (10). According to the invention, the transporting device (40, 42) includes a plurality of part-transporting devices (43), and one part-transporting device (43) is associated with each withdrawable module (14) and is solidly connected to the withdrawable module (14). Moreover, at least some of the part-transporting devices 43 include a first transportation path (40), which is embodied for transporting a workpiece (56) essentially over the width of the withdrawable module (14) in a first transporting direction (T1).

27 Claims, 9 Drawing Sheets

FOREIGN PATENT DOCUMENTS

| | | |
|---|---|---|
| DE | 19729369 A1 * | 1/1999 |
| DE | 20 2004 020 190 | 3/2005 |
| EP | 1 637 280 | 3/2006 |
| JP | 2005-059180 | 3/2005 |
| WO | 2005/095049 | 10/2005 |
| WO | WO 2005095049 A1 * | 10/2005 |

* cited by examiner

PROCESSING STATION FOR A PROCESSING LINE HAVING A MODULE PLATFORM AND WITHDRAWABLE MODULES THAT CAN BE INTRODUCED INTO THE MODULE PLATFORM

CROSS-REFERENCE TO A RELATED APPLICATION

The invention described and claimed hereinbelow is also described in German Patent Application DE 10 2006 002 082.0 filed on Jan. 16, 2006. This German Patent Application, whose subject matter is incorporated here by reference, provide the basis for a claim of priority of invention under 35 U.S.C. 119(a)-(d).

BACKGROUND OF THE INVENTION

The present invention relates to a processing station for a processing line, having a module platform and a plurality of withdrawable modules that can be introduced into it, and the processing station has a transporting device for transporting workpieces to be processed at the processing station.

Such processing stations are known for instance from German Patent Disclosures DE 197 29 369 A1 and DE 197 41 671 A1. In these known processing stations, a transporting device that can convey workpieces over the full width of the module platform is solidly connected to the module platform. In the module platform, so-called drawer receptacles are provided, into which withdrawable modules, called "process modules", can be introduced. Identical processing stations are lined up with one another to make a processing line.

The known withdrawable modules include at least control housings, which are required for controlling individually components, such as processing and handling devices. However, they can also themselves include the aforementioned devices.

Because of the modular construction of the known processing stations, relatively fast conversion of a processing station from one processing task to another is possible. The term "processing task" means even purely handling operations, with which only a change of position or orientation of workpieces is associated, but not a change of material and/or form or the like.

U.S. Pat. No. 4,519,491 A is also noted.

A disadvantage of the known processing stations of this generic type is the calibration effort and expense in conversion from one processing task to another, since the new withdrawable module, with the devices optionally provided on it, after being introduced into the module platform has to be aligned with the transporting device, solidly joined to the module platform, and calibrated, since it must be assured that for the processing, the workpieces are located at a well-defined location, where automated processing and/or handling can be done with sufficiently great precision.

SUMMARY OF THE INVENTION

It is therefore the object of the present invention to refine the known processing stations such that the necessary calibration work can be avoided or postponed, so that even faster conversion of the processing station from one processing task to another is possible.

This object is attained according to the present invention in that the transporting device includes a plurality of part-transporting devices, and one part-transporting device is associated with each withdrawable module and is solidly connected to the withdrawable module and is capable of being introduced jointly with it into the module platform, and the part-transporting device of at least some of the withdrawable modules has a first transportation path, which is embodied for transporting a workpiece essentially over the width of the withdrawable module in a first transporting direction.

Since the transporting device includes part-transporting devices, each of which is solidly joined to a withdrawable module, the alignment of bnhs, which may likewise be provided on the withdrawable module, can be done even before the withdrawable module and module platform are brought together, so that the alignment of bnhs can be done in the context of work preparation, at a noncritical time, and does not prolong the actual conversion operation, that is, the time from the end of work at the already set-up processing station until work begins at the converted processing station.

It is true that compared to the processing stations of the prior art, a certain additional expense must be expected because of the plurality of part-transporting devices required. Surprisingly, however, it has been demonstrated that in mass production of the withdrawable modules of the processing station of the invention, with the part-transporting device provided on each of them, greater effort and expense in producing the individual module can be supercompensated for, so that not only the advantages of faster convertibility of each processing station but also cost advantages in the production of the withdrawable modules are attainable.

It does in principle suffice to provide a part-transporting device which is embodied for conveying a workpiece past the withdrawable module, or in other words from a preceding withdrawable module to a following withdrawable module in the transporting direction. However, the capacity of the processing station can be increased substantially by providing that the part-transporting device includes a second transportation path for transporting a workpiece in a second transporting direction that is opposite the first. Moreover, this does not preclude a processing station from having withdrawable modules with a part-transporting device which diverts the workpiece, preferably by 90° or 180°.

In principle, the part-transporting devices should be embodied not only for conveying the workpiece over one complete withdrawable module size, but instead to stop the workpiece as well at a predetermined or predeterminable position. For that purpose, the transportation paths can have selectively triggerable stopping devices, which are activatable for stopping a workpiece in a defined position. However, it is also conceivable to stop or remove the workpiece on or from the conveyor belt by means of a handling device, such as a robot. It is also conceivable to stop the part-transporting device as a whole in operation, in order to stop a workpiece in a desired position. This suffices for instance whenever processing of the workpiece on the transportation path itself is desired.

A further advantage of the present invention resides in the targeted operability of the transportation paths of the individual withdrawable modules. This is because, if a plurality of withdrawable modules with processing devices located on them are provided in a processing station, then the transportation paths of the individual withdrawable modules can be triggered individually and can convey workpieces independently of one another into desired positions inside the processing station.

For the most flexible possible flow of material, it may be provided that the withdrawable module includes a transportation path relocating device for relocating workpieces between the first and second transportation paths.

For forming a processing line from a plurality of processing stations following one another in the material flow direction, each processing station having one module platform and withdrawable modules, it is advantageously provided that the transportation paths of the plurality of withdrawable modules adjoin one another to form a processing station transportation path in the respective transporting direction.

It is certainly known in the prior art to deflect workpiece transportation by a certain angle, often 90°, for instance by means of a lifting/transverse device. The term "transporting directions" used here should be understood to mean the material flow directions, regardless of such deflections.

The best possible accessibility to withdrawable modules at the processing station can be assured by providing that withdrawable modules are capable of being introduced into the module platform parallel to one another in an insertion direction.

As has already been said above, it is conceivable in principle to process workpieces directly on the transportation path. However, for the flexibility of the processing station, and associated with this the best possible utilization of its processing capacity, it is advantageous if the withdrawable module has a processing nest separate from a transportation path and also has a process relocating device which is embodied for relocating a workpiece between the first transportation path and the processing nest. To that end, the workpiece can accordingly be taken from the first transportation path and delivered to the processing nest, processed there independently of any other transporting operations taking place, and finally set back onto the first transportation path again.

In the advantageous case just mentioned, for reducing the work of alignment and calibration between the first transportation path and the process relocating device, it is advantageous if these are combined in a preassembled structural unit. Then once again the calibration and alignment work between the first transportation path and the process relocating device can be done at arbitrary, suitable, noncritical times, regardless of the conversion operation and even regardless of the mounting of the structural unit on the withdrawable module.

It is especially advantageous in this respect if the preassembled structural unit also includes the processing nest. As a result, the alignment and calibration of the processing nest, in which the processing of the workpiece is done away from the transportation path, can also be performed at noncritical times during the preparation for work, so that these jobs do not burden the conversion operation timewise, either.

Finally, it can also be provided that the preassembled structural unit also includes the second transportation path, so that the second transportation path can also be aligned and calibrated beforehand in the structural unit. The same is true for the transportation path relocating device, which is advantageously likewise included by the preassembled structural unit.

Moreover, in an advantageous embodiment of the present invention, it may be provided that the relocating devices and transportation paths are each separate functional units, which are located and aligned as such on the structural unit. This has the advantage that internal jobs in functional units that pertain only to the relocating devices or the transportation paths can again be done independently of how the functional units are mounted in the structural unit.

In principle, to attain the object of the invention, it suffices if the withdrawable module includes a first transportation path, solidly joined to it, that can be inserted into the module platform and removed from it together with the withdrawable module, since already by this provision, a defined position of workpieces on the withdrawable module can be defined in advance.

Especially advantageously, however, processing and/or handling devices for performing the various processing and/or handling operations on the workpiece are already provided on the withdrawable module. To that end, the withdrawable module may have a processing region that is intended for the arrangement of such devices. Hence the withdrawable module manufacturer can ship the withdrawable module with the transportation path and optionally other transportation paths and relocating devices, and the customer can use the processing region for obtaining a particular desired configuration of the withdrawable module by the placement of individual processing and/or handling devices in it. However, it is also conceivable for the manufacturer to ship the withdrawable module with processing and/or handling devices already located on it.

In order that the withdrawable module can be reached easily by a human operator, the withdrawable module can have a operator side that is accessible to a human operator. It is also advantageous if the transporting device is provided between this operator side and the processing region, since then a human operator can perform manual work on workpieces, parallel with any processing and/or handling devices provided in the processing region, for instance on workpieces that are transported on the first or the second transportation path.

For the fastest possible supply of current to the withdrawable modules and for data exchange, it is advantageously provided that one component, either the withdrawable module or the module platform, includes at least one male electrical plug, and the respective other component includes at least one female electrical plug for connection to the at least one male electrical plug, in order to transmit electrical energy and/or electrical signals, in particular electrical status signals and/or control commands between the withdrawable module and the module platform.

The number of female electrical plugs need not necessarily match the number of male electrical plugs. For instance, on one of the components, a large female electrical plug may be provided, into which a plurality of male electrical plugs of the respective other component can be plugged.

The same is true for supplying the withdrawable modules with compressed air. For that purpose, it can be provided that one component, either the withdrawable module or the module platform, includes at least one male pneumatric plug, and the respective other component includes at least one female pneumatric plug for connection to the at least one male pneumatric plug, in order to transmit compressed air between the withdrawable module and the module platform.

For maintenance and adjustment work at the withdrawable module and for making a connection for transmitting electrical energy and/or electrical signals and/or compressed air, it is advantageous if at least one plug connection element: male electrical plug, female electrical plug, male pneumatric plug, female pneumatric plug, is connected to the withdrawable module via a flexible cord. In that case, the withdrawable module can be pulled out of the module platform, so that it is accessible from multiple sides, without having to interrupt the electrical and/or pneumatic energy supply and/or signal transmission to and from the withdrawable module. Moreover, by the provision of male and female plugs on flexible cords, the desired plug connection can be made independently of sliding the withdrawable module into the module platform.

The signal- and energy-transmission connection of the withdrawable module to the module platform can be simplified still further by providing that one component, either the withdrawable module or the module platform, has a hybrid male plug with at least one male electrical plug and at least one male pneumatric plug, and the respective other component has a hybrid female plug with at least one female electrical plug and at least one female pneumatric plug.

In principle, it suffices to supply the withdrawable module with compressed air centrally. Then, a valve assembly can be provided on the withdrawable module that includes a plurality of pneumatic switching valves, and the pneumatic switching valves can then be programmed and controlled to suit the configuration of the withdrawable module for processing and/or handling tasks.

To avoid possible pollution of the processing and/or handling devices at the withdrawable module with oily waste air from the valve assembly, it is advantageous if at least one transportation path is located between the valve assembly and the processing region.

For coordinating the operations at one processing station with a plurality of withdrawable modules or a plurality of withdrawable module spaces, the module platform advantageously includes a central control device, which can be provided in a switchbox on the module platform. The processing station can be embodied such that the central switchbox, after a suitable connection is made between the module platform and the withdrawable module, either communicates directly with the transporting device and optionally the relocating devices or communicates with its own controller of the withdrawable module for the transporting device and the relocating devices. It can furthermore be provided that the withdrawable module has a control housing for receiving control structural units for controlling the processing and/or handling devices, to make a compact construction of the withdrawable module possible.

The transportation paths, that is, the first or second transportation path, may be embodied such that a transportation path has one conveyor belt and/or two conveyor belts, spaced apart from one another orthogonally to the respective transporting direction, and/or one control command and one passive conveyor device, such as a transportation roller path, spaced apart from the control command and orthogonal to the respective transporting direction. Particularly embodying the transportation path with conveyor belts spaced apart from one another, or with a conveyor belt and a passive conveyor device spaced apart from it, is suitable for locating the aforementioned stopping device between the conveyor belts, or between a conveyor belt and the passive conveyor device.

For generating the most flexible possible flow of material in the processing station, as already indicated, the process relocating device can be embodied for holding a workpiece in the processing nest in such a manner that a further workpiece on the first transportation path is capable of passing the processing nest with the workpiece retained in that nest. As a result, it is possible for workpieces to be processed parallel or at least quasi-parallel in the processing station, or even to perform processing operations in different withdrawable modules with different cycle times in one processing station.

Structurally, the process relocating device can include a lifting/pivoting device, which is embodied for raising a workpiece in one position out of the first transportation path and processing nest and pivoting it by essentially 180° into the respective other of these positions.

The overtaking function can be implemented by providing that the process relocating device includes two lifting devices, in particular reciprocating pistons, which are actuatable separately from one another, and of which when the process relocating device is not in motion one lifting device is assigned one position out of the first transportation path and the processing nest, and the other lifting device is assigned the respective other position.

In the processing station, the workpieces to be processed are advantageously transported in workpiece holders provided for the purpose.

Since the above-described withdrawable modules lend the above-described processing station special value, patent protection is sought for the withdrawable modules as well.

The present invention will be described hereinafter in conjunction with the accompanying drawings.

Figure 1:
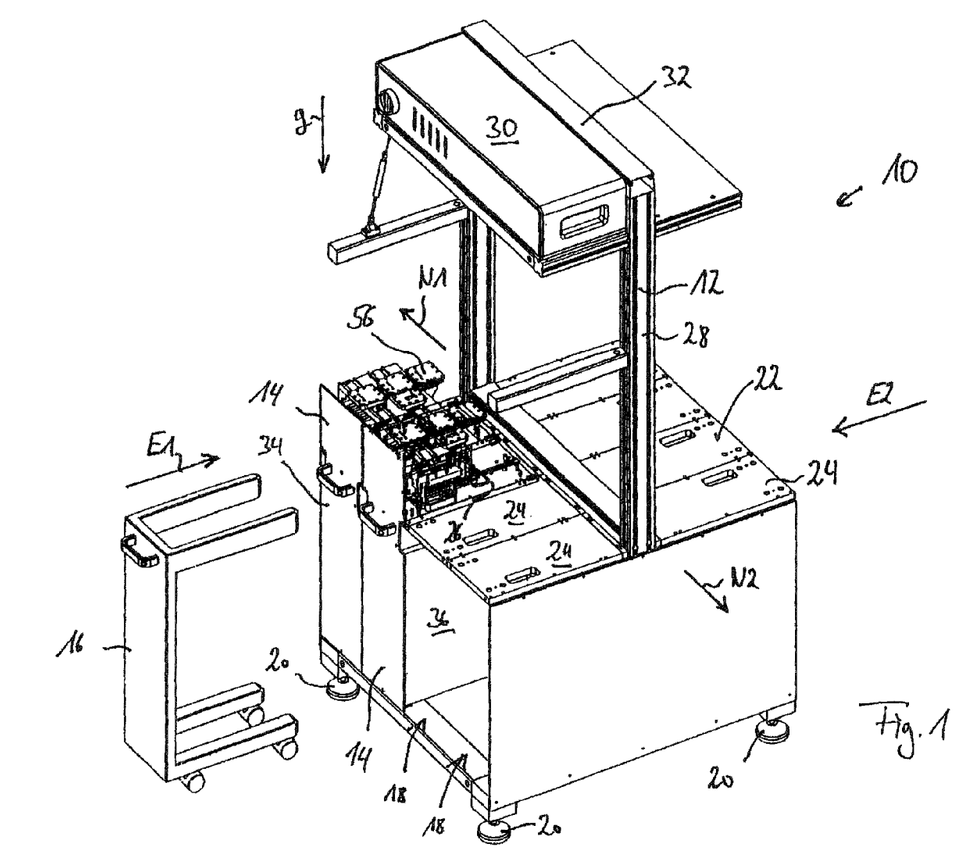
FIG. 1 shows a first embodiment of a processing station according to the invention.

In FIG. 1, a view according to the invention is shown of a processing station identified in general by reference numeral 10.

DESCRIPTION OF THE PREFERRED EMBODIMENTS

The processing station 10, which may be a component of a processing line, not shown, serves to process and handle workpieces, for instance for assembling small equipment, such as power drill gears, and the like. The processing station 10 includes a framework 12, which serves as a module platform, into which withdrawable modules 14 can be inserted in a first insertion direction E1. For that purpose, a withdrawable module 14 is placed with an auxiliary cart 16 in front of the desired module receptacle 18 and is then inserted into the module platform 12 in the first insertion direction E1.

The module platform 12 is constructed such that four withdrawable modules 14 can be inserted side by side in the first insertion direction E1 into the module platform, and four further withdrawable modules on the opposite side of the module platform 12 can be inserted into the module platform in a second insertion direction E2. The insertion directions E1 and E2 are opposed to one another.

The module platform 12 rests on adjustable-feet 20, so that a bottom face 22 of the module platform can be aligned with respect to the direction g of gravity, preferably in such a way that the bottom face 22 is "in the water".

The bottom face 22 is formed of a total of eight flat base plates 24, all of which together form a common support plane. Each base plate 24 is assigned to one module receptacle 18.

The withdrawable modules 14 include module base plates 26, which rest essentially flatly on the base plate 24 whenever the withdrawable module 14 has been inserted into the module platform 12.

The module platform 12, on an upper framework 28 protruding past the bottom face 22, has a switchbox 30, which includes a control/regulating device, which communicates with the withdrawable modules 14 when they have been inserted into the module platform 12. A cable conduit 32, extending across the width of the module platform 12, is furthermore provided, in which supply and data transmission lines for a processing line can be located.

In the direction of the arrows N1 and N2 next to the processing station 10, further identical or similar processing stations can be provided, for forming a processing line.

Figure 2:
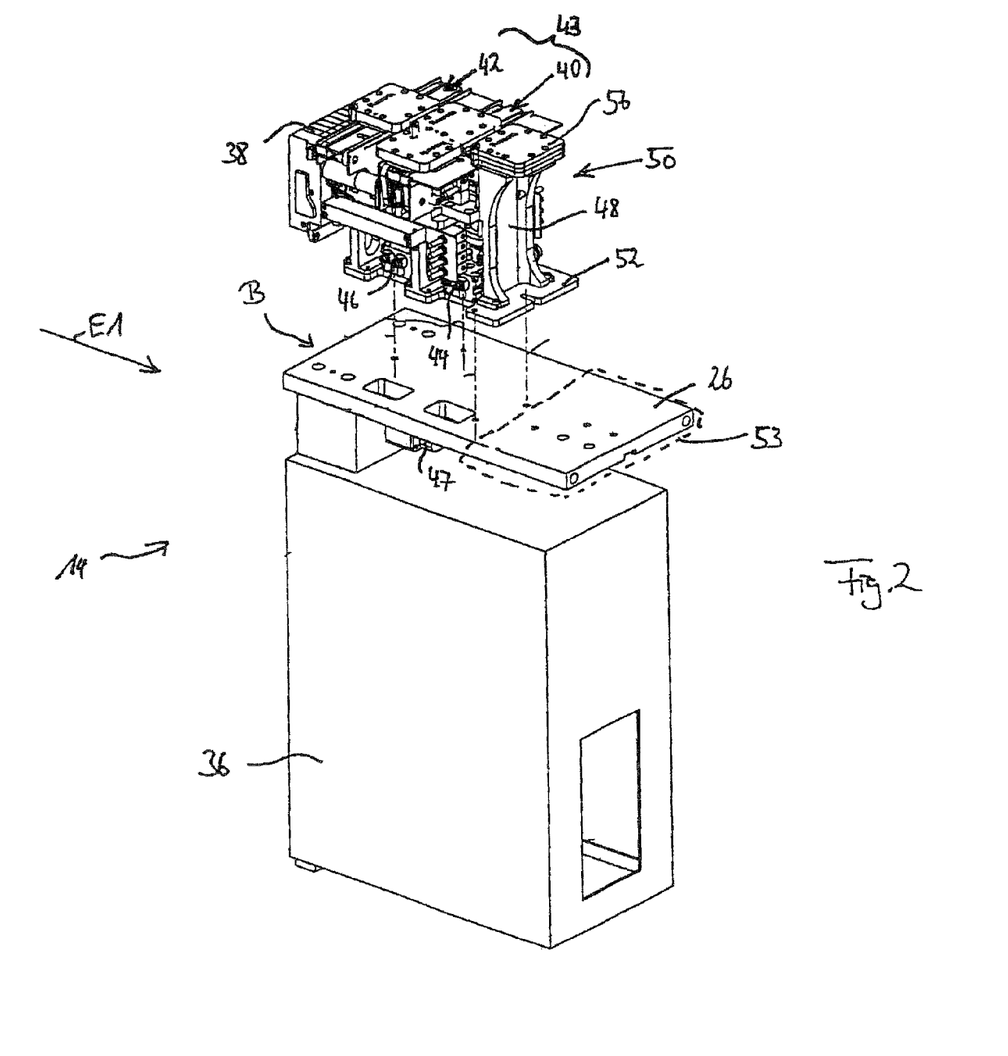
FIG. 2 shows a perspective exploded view of a withdrawable module of FIG. 1.

In FIG. 2, a perspective exploded view of the withdrawable module 14 is shown; the plate 34 toward the operator (see FIG. 1) has been left out, for the sake of simplicity.

The withdrawable module 14 includes a control housing 36, in which control/regulating units can be received, which can be embodied for controlling processing and/or handling devices, not shown, that can be located on the module base plate 26. The control/regulating units provided in the control housing 36 can also be embodied for triggering a valve island 38, a first transportation path 40, and a second transportation path 42, and for controlling a process relocating device 44 and a transportation path relocating device 46. The control/regulating units can be connected to the switchbox 30 and the control/regulating device provided in it via a hybrid male plug 47, which, whenever the withdrawable module 14 has been inserted into the module platform 12, is inserted into a hybrid female plug, not shown, that is provided on the module platform 12. The hybrid male plug 47 includes one or more male electrical plugs and one or more male pneumatric plugs. The hybrid female plug furthermore includes one or more female electrical plugs and one or more female pneumatric plugs. The valve island 38, the transportation paths 40, 42, and the relocating devices 44, 46 can alternatively, via a hybrid male plug or an male electrical plug, also be connected directly to the control/regulating device in the switchbox 30 without the intermediate placement of a control/regulating unit in the control housing 36.

The male pneumatric plug of the hybrid male plug 47, on insertion of the withdrawable module 14 into the module platform 12, forms a plug connection with a female pneumatric plug, provided in the hybrid female plug of the module platform 12, for carrying compressed air as far as the valve island 38. There, depending on the triggering of the pneumatic switching valves located in the valve island 38, the compressed air can be carried selectively onward.

The valve island 38, the transportation paths 40 and 42, the relocating devices 44 and 46 (see also FIG. 3), and a processing nest 48 are mounted as a preassembled structural unit 50 on the module base plate 26. The preassembled structural unit 50, for that purpose, includes a common structural unit base plate 52, which carries the components of the preassembled structural unit 50.

The preassembled structural unit 50 is mounted on the module base plate 52 in such a way that the valve island 38 is placed closer to the operator side B of the withdrawable module 14. As a result, any oily waste air from the pneumatic switching valves of the valve island 38 can be prevented from reaching processing and/or handling devices that can be located downstream, in terms of the insertion direction E1, from the processing nest 48. For their placement, a processing region 53, indicated by dashed lines, is reserved on the module base plate 26. To facilitate the placement of such processing and/or handling devices, bores and/or holes and/or grooves can be provided in the module base plate 26.

Figure 3:
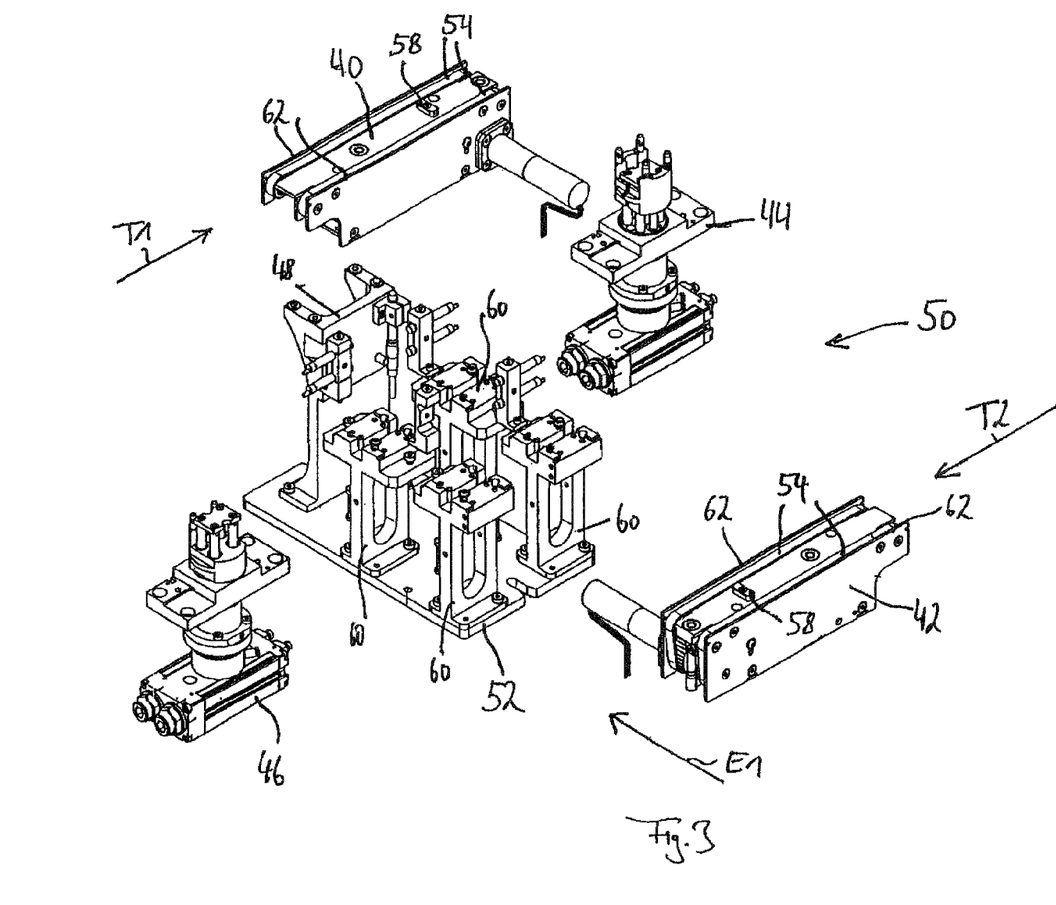
FIG. 3 shows a perspective exploded view of a control command comprising a transporting device, relocating devices and a processing nest, on the withdrawable module of FIGS. 1 and 2.

In FIG. 3, the preassembled structural unit 50 is shown in an exploded view. The valve island 38 has been left out of the view in FIG. 3.

The first transportation path 40 and the second transportation path 42, which in the example shown form a part-transporting device 43, are constructed essentially identically and are formed by a double-belt conveyor device. To that end, the second transportation path 42, which in this description represents the first transportation path 40 as well, includes two parallel belt conveyor belts 54 spaced apart from one another. The second transportation path 42 is provided for moving workpiece holders 56 (see FIG. 1 or FIG. 2) in a second transporting direction T2. Accordingly, the first transportation path 40 is embodied for conveying workpiece holders in the opposite, first transporting direction T1.

The second transportation path 42, like the first transportation path 40, includes a stop 58 that is selectively adjustable between a stop position and an open position, which in the extended state acts as a stop for workpiece holders conveyed on the transportation paths 40 and 42 and in the retracted state is run over by these workpiece holders.

Like the processing nest 48, various individual holders 60 are screwed onto the structural unit base plate 42. The holders 60 serve to receive the transportation paths 40 and 42 and the relocating devices 44 and 46. In an advantageous refinement, not shown, of the present invention, the four individual holders 60 can also be combined into one integral holder arrangement.

By means of the arrangement shown in FIG. 3, the transportation paths 40 and 42, the relocating devices 44 and 46, and the processing nest 48 can be aligned ideally with one another, before the withdrawable module 14 that holds the structural unit 50 is inserted into a module platform 12.

The relocating device 46 shown in FIG. 3 is a transportation path relocating device, which is embodied for relocating workpiece holders from the first transportation path 40 to the second transportation path 42 and vice versa. To that end, the relocating device 46 lifts the workpiece holder on a transportation path until the workpiece holder becomes disengaged from the guide strips 62 of the transportation paths 40 and 42. Then, the relocating device 46 pivots the workpiece holder 1800 and sets it down between the guide strips 62 of the respective other transportation path. It follows that the transportation paths 40 and 42 are located at a spacing from one another that is determined by the size of the workpiece holder 56, and the axis of rotation of the relocating device 46 is located in the middle, spaced apart by the same distance from each of the transportation paths 40 and 42.

The relocating device 44 is conversely a process relocating device, which is embodied for relocating workpiece holders from the first transportation path 40 to the processing nest 48 and vice versa. As a result, a workpiece holder can be taken from the transportation path and processed at the processing nest 48 by processing and/or handling devices, regardless of transporting operations taking place on the first transportation path.

Figure 4:
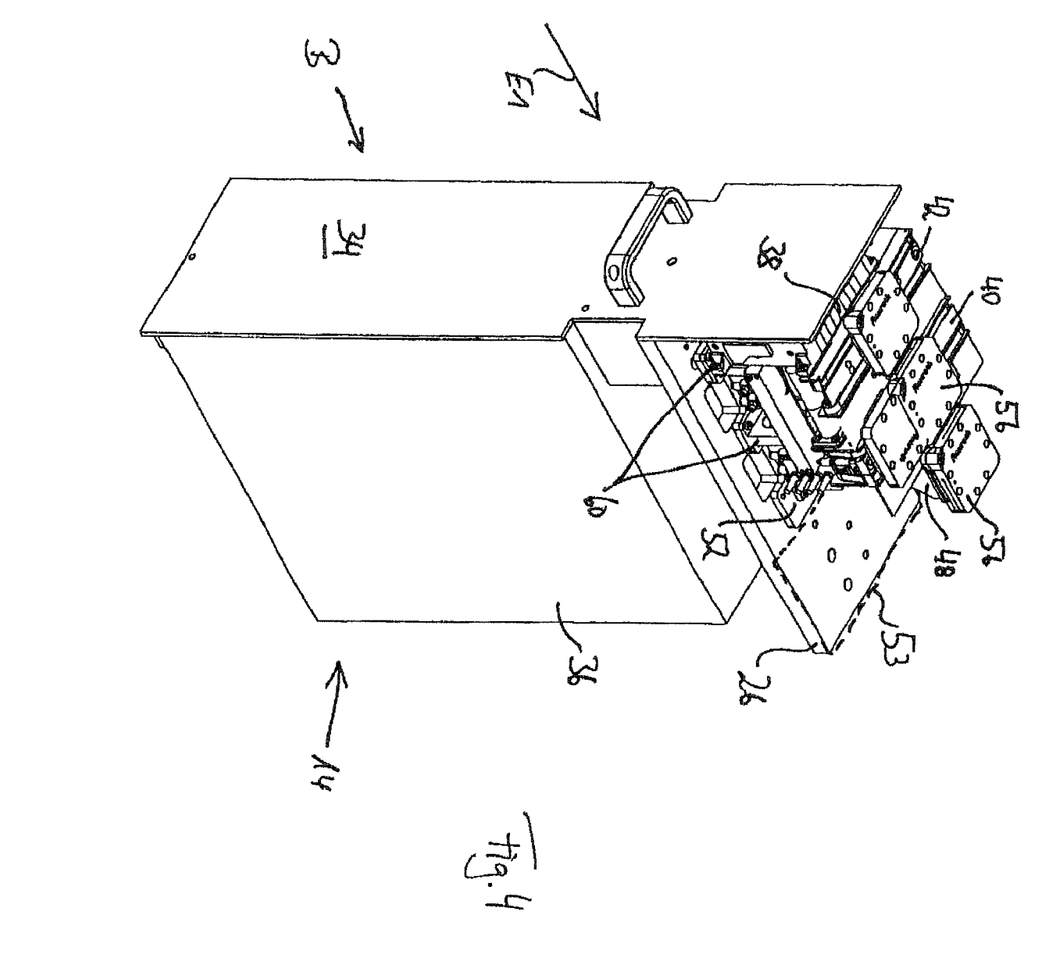
FIGS. 4-6 show perspective views of the withdrawable module of FIGS. 1 and 2.

In FIG. 4, the withdrawable module 14 is shown, seen from a different perspective.

Figure 5:
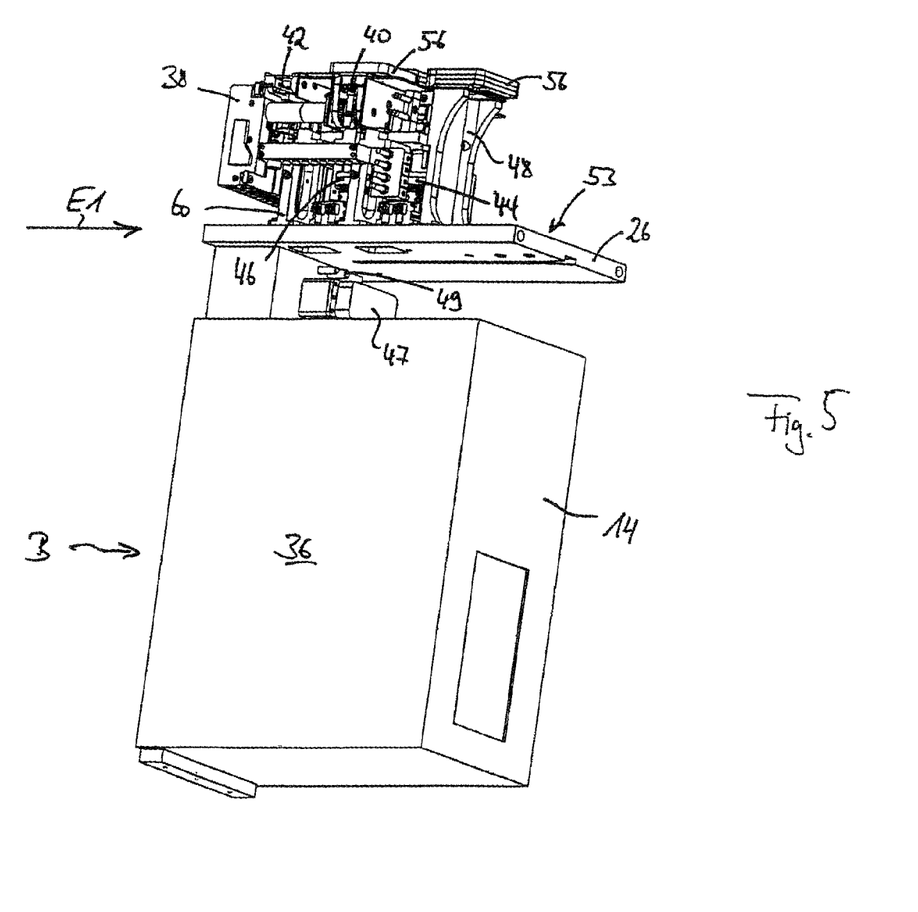

A further perspective view of the withdrawable module 14 without the plate 34 toward the operator is shown in FIG. 5. There, a securing screw 49 is also shown, with which the withdrawable module 14 can be secured to the module platform.

Figure 6:
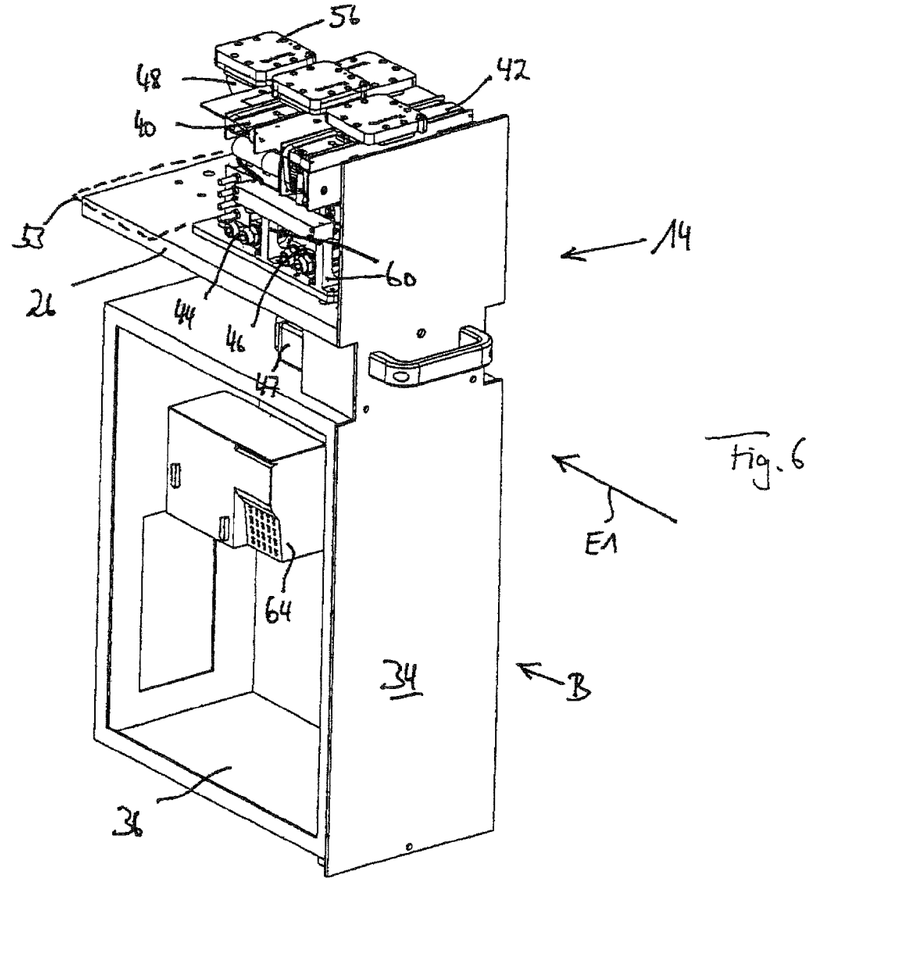

In FIG. 6, the withdrawable module 14 is shown from still another perspective; the control housing 36 is shown open, and a control/regulating 64 provided in it can be seen, which is prepared for controlling processing and/or handling devices that have not yet been located in the processing region 53.

Figure 7:
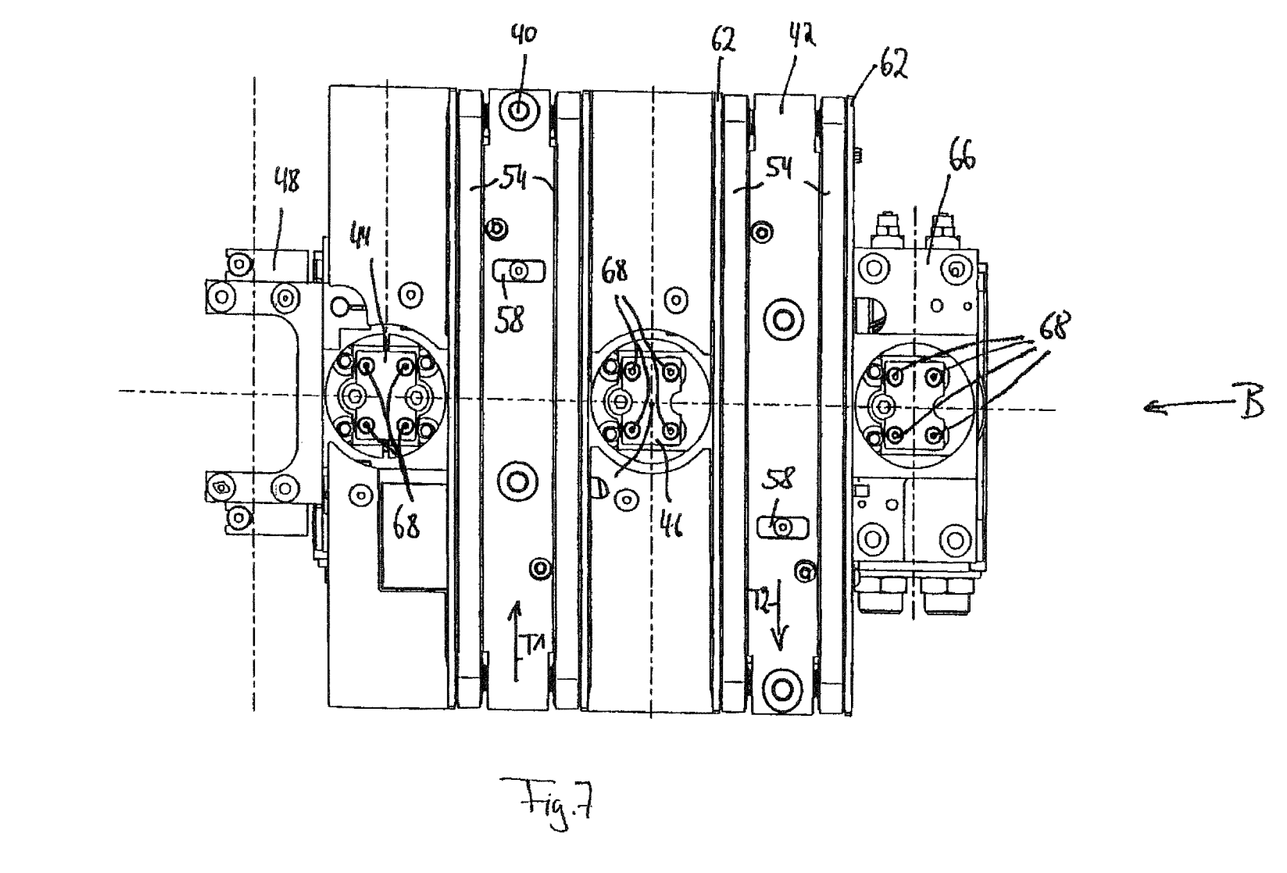
FIG. 7 shows a top view on the transporting device with relocating devices and the pn of the withdrawable module of FIGS. 1, 2 and 4-6.

In FIG. 7, a top view is shown onto the first and second transportation paths 40, 42, the process relocating device 44, the transportation path relocating device 46, and the processing nest 48. A third relocating device 66 is also shown, which is capable of pivoting a workpiece holder, not shown, from the second transportation path 42 to the side pointing away from the processing nest 48, or in other words toward the operator side B. Each of the relocating devices 44, 46, 66 has a total of four pilot pins 68, which engage the workpiece holder in order to relocate it. The pins 68 are essentially identical and are merely located with a different orientation on the various relocating devices.

For relocating a workpiece holder, only two of four pins 68 of one relocating device each engage corresponding recesses 60 (see FIG. 8) in the workpiece holder 56. Pins 68 spaced apart from one another in the transporting direction T1 and T2 always form such engagement pairs. The axis of rotation of the transportation path relocating device 46 is marked D in FIG. 7. It is orthogonal to the plane of the drawing in FIG. 7. The axis of rotation D has the same spacing from the first transportation path 40 as from the second transportation path 42. A workpiece holder moved by the transportation paths 40 and 42 must be at least wide enough that the pairs of pins 68 located closer to the particular transportation path on which the workpiece holder is being moved are capable of engaging the workpiece holder. In order that the workpiece holder 56 can be grasped selectively both by the transportation path relocating device 46 and by the process relocating device 44 or the third relocating device 46 (depending on which transportation path it is located on), the workpiece holder preferably protrudes to both sides of the transportation paths 40 and 42 past the transportation paths by a suitable amount.

With the transportation path relocating device 46 located in the middle between the first and second transportation paths 40 and 42, the process relocating device 44 is located in the middle of the spacing between the processing nest 48 and the first transportation path 40.

So that the orientation of a workpiece holder 56 on the transportation paths 40, 42 will not be critical, preferably essentially symmetrical workpiece holders 56 with a square outline will be used, which have recesses 70 on each side for engagement by the pins 68.

It will be noted that the axes of rotation D of all the relocating devices 44, 46 and 66 in FIG. 7 all have the same spacing from the respective closest associated transportation path.

Figure 8:
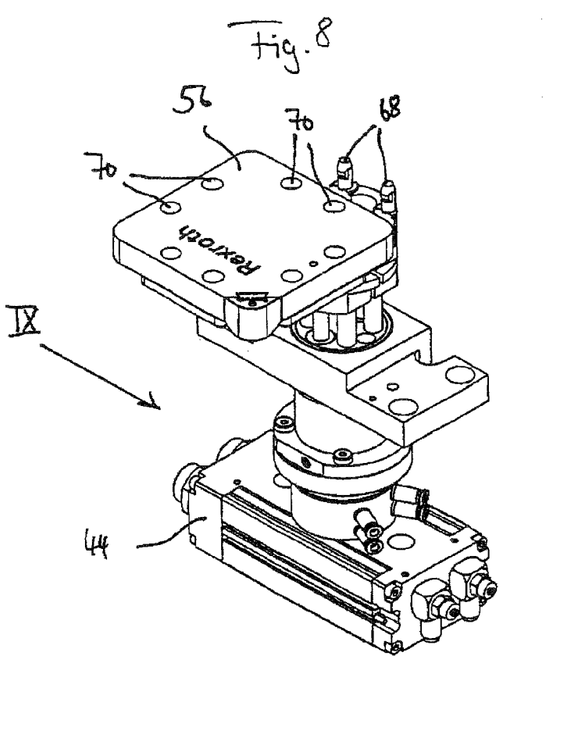
FIG. 8 shows a perspective view of a relocating device with a workpiece holder of the structural unit of FIG. 3.

In FIG. 8, the process relocating device 44 is shown in perspective. The process relocating device 44 in FIG. 8 is in engagement with the workpiece holder 56 having the substantially square outline. The recesses 70 for engagement by the pins 68 of the process relocating device 44 can be seen.

Figure 9:
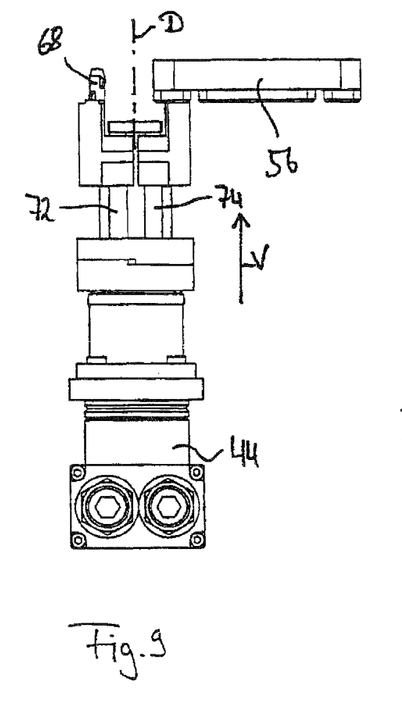
FIG. 9 shows a front elevation view of the relocating device of FIG. 8.

In FIG. 9, a front view in the direction of the arrow IX in FIG. 8 is shown of the process relocating device 44.

The relocating devices 44, 46 and 66 used in the example shown are so-called lifting-rotating units, which after grasping a workpiece holder 56 lift it in the direction of the arrow V along its axis of rotation D and pivot it by 180° about this axis of rotation D. For lifting workpiece holders 56, the process relocating device 44 has two lifting systems 72 and 74, actuatable separately from one another, which assures that a workpiece holder received in the processing nest 48 can be grasped and lifted by one of the lifting devices 72 or 74, without the other lifting device being raised as well and thus protruding into the path of motion of a workpiece holder that is moving along the first transportation path 40. This assures that the transporting function of the transportation path 40 is preserved, regardless of whether a workpiece holder is located in the processing nest 48 or not. As a result, workpiece holders from the transportation path 40 can pass a workpiece holder received in the processing nest 48.

Figure 10:
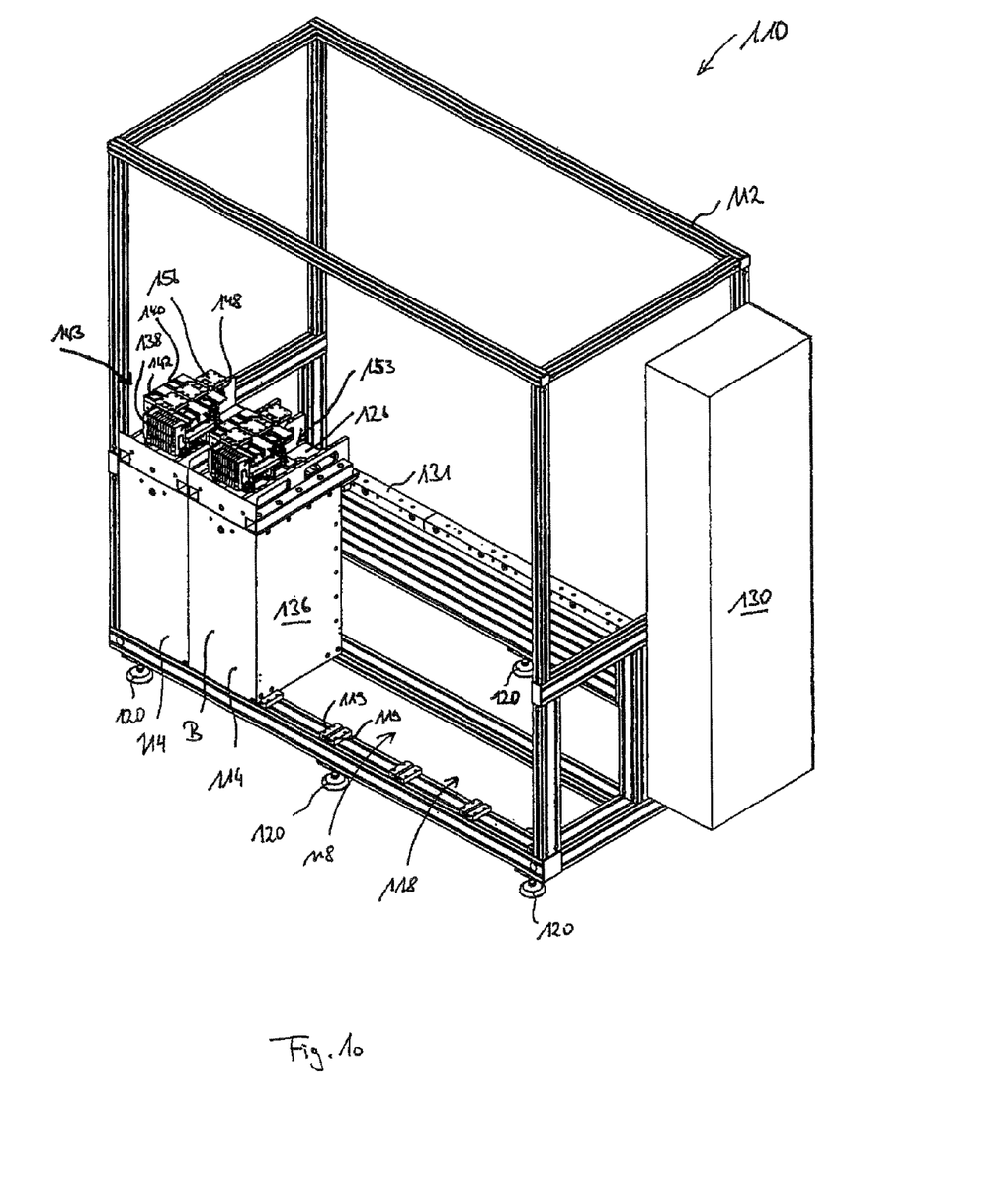
FIG. 10 shows a further embodiment of a processing station according to the invention.

In FIG. 10, a view is shown of a second embodiment of a processing station according to the invention. Components identical to the above FIGS. 1 through 9 are identified by the same reference numerals, but raised by 100. For the description of these components, the explanation of them in conjunction with FIGS. 1 through 9 is expressly referred to. The embodiment shown in FIG. 10 will be described below only to the extent that it differs from the first embodiment shown in FIGS. 1 through 9.

The view of the processing station 110 shown in FIG. 10 is similar to that of the first embodiment of a processing station 10 in FIG. 1.

The framework 112 that forms the module platform is embodied as a frame construction made of extruded profiles.

In contrast to the first embodiment of a processing station, the module platform 12 in the second embodiment has no bottom face that is assembled from base plates. Instead, in the withdrawable modules 114, the various module base plates 126 form a lid for the control housing 136 of the withdrawable module 114. This means that the module base plate 126 forms a wall defining the control housing 136.

The module base plates 126 thus form one common bottom face, which is the sole bottom face of this processing station 110.

It is expressly pointed out that the processing station 110 of the second embodiment, in the version shown in FIG. 10, can receive up to twelve withdrawable modules 114, so that the processing station 110 of FIG. 10, in cases where only a few work operations are required, can form a self-contained processing system, in which no further module platforms adjoin one another laterally. For this reason, the switchbox 130 can be located on the side of the module platform 112. A similar location of the switchbox can be achieved also if further processing stations adjoin the processing station 110 on only one side, for instance if a processing line is formed of two processing stations.

The withdrawable modules 114 shown in FIG. 10 likewise have an male electrical plug or female electrical plug and/or a male pneumatric plug or a female pneumatic plug, but these plug connections are not provided rigidly on the withdrawable module 114 but instead are connected to the withdrawable module 114 by suitable electric and/or pneumatic lines. By the provision of the electric and male pneumatric plug connection at the end of a line connected to the withdrawable module 114, the withdrawable module 114 can advantageously be removed from its module receptacle 118 on the module platform 112, without having to interrupt its supply of electric current and/or compressed air. This makes maintenance and adjustment work on the various withdrawable modules 114 considerably simpler. Moreover, the withdrawable module 114, if desired, can be inserted into the module platform 112 without a connection for energy and/or signal transmission necessarily having to be made.

Optionally, depending on its functional embodiment, one withdrawable module 114 can have a plurality of lines with electric and/or pneumatic plug connections. The lines are therefore provided module-specifically.

In FIG. 10, the positioning strip 131 can be seen, which has recesses that are engaged by positioning pins on the withdrawable module. So that withdrawable modules of various widths can be used at the processing station 110, the positioning strip 131 has many recesses closely spaced in a matrix. The positioning strip 131 can furthermore be embodied as a supply strip that has the suitable female plugs into which the male plugs on the ends of the lines of the withdrawable modules 114 can be plugged for supplying the withdrawable modules 114 with electric current and compressed air.

The term "plug connection" in the sense of the present application is intended to mean that a conductive connection can be generated in a very simple way, for instance by a plugging motion, which is not meant to preclude the possibility that after the plug connection has been established, a further relative motion of the plug may take place for securing or loosening the plug connection.

In the exemplary embodiment shown in FIG. 10, the module receptacles 118 are marked by boundary stones 119 that are displaceable in longitudinal grooves in the extruded profiles. By displacement of these boundary stones 119, the module receptacle 118 can be adapted to receive withdrawable modules 114 of various widths.

As can be seen in FIGS. 1 and 10, the part-transporting devices 43 and 143 of the individual withdrawable modules 14 and 114 together form the transporting device of the entire processing station 10 and 110.

For forming a processing line, it is understood that the processing stations of the first and second embodiments may be combined.

The invention claimed is:

1. A processing station for a processing line, comprising a module platform (12; 112) and a plurality of withdrawable modules (14; 114) that can be introduced into it, and the processing station (10; 110) has a transporting device (40, 42; 140, 142) for transporting workpieces (56; 156) to be processed at the processing station (10; 110),
wherein the transporting device (40, 42; 140, 142) includes a plurality of part-transporting devices (43; 143), wherein one part-transporting device (43/143) is associated with each withdrawable module (14; 114) and is solidly connected to the withdrawable module (14; 114); the part-transporting device is capable of being introduced jointly with the withdrawable module into the module platform (12; 112), and wherein the part-transporting device (43/143) of at least some of the withdrawable modules (14; 114) has a first transportation path (40; 140), which is embodied for transporting a workpiece (56; 156) essentially over the width of the withdrawable module (14; 114) in a first transporting direction (T1), wherein the part-transporting device (43; 143) includes a second transportation path (42/142) for transporting a workpiece (56; 156) in a second transporting direction (T2) that is opposite the first, wherein the withdrawable module (14; 114) includes a transportation path relocating device (46; 146) for relocating workpieces (56; 156) between the first and second transportation paths (40, 42; 140, 142), and wherein the first transportation path (40; 140), the second transportation path (42; 142) and the transportation path relocation device (46) are combined in a pre-assembled structural unit (50).

2. The processing station as defined by claim 1, wherein the part-transporting device (43; 143) includes a second transportation (42; 142) for transporting a workpiece (56; 156) in a second transporting direction (T2) that is opposite the first.

3. The processing station as defined by claim 1, wherein the withdrawable module (14; 14) includes a transportation path relocating device (46; 146) for relocating workpieces (56; 156) between the first and second transportation paths (40, 42; 140, 142).

4. The processing station as defined by claim 1, wherein the transportation paths (40, 42; 140, 142) of the plurality of withdrawable modules (14; 114) adjoin one another to form a processing station transportation path in the respective transporting direction (T1, T2).

5. The processing station as defined by claim 1, wherein withdrawable modules (14; 114) are capable of being introduced into the module platform (12; 112) parallel to one another in an insertion direction (E1, E2).

6. The processing station defined by claim 1, wherein the withdrawable module (14; 114) has a processing nest (48; 148) and a process relocating device (44) which is embodied for relocating a workpiece (56; 156) between the first transportation path (40; 140) and the processing nest (48; 148).

7. The processing station as defined by claim 6, wherein the first transportation path (40; 140) and the process relocating device (44) are combined in a preassembled structural unit (50).

8. The processing station as defined by claim 7, wherein the preassembled structural unit (50) also includes the second transportation path (42; 142).

9. The processing station as defined by claim 1, wherein the withdrawable module (14; 114) has a processing region (53; 153), in which it is possible to locate processing and/or handling devices.

10. The processing station as defined by claim 9, wherein the withdrawable module (14; 114) has a operator side (B) that is accessible to a human operator, and the transporting device (40, 42; 140, 142) is provided between the operator side (B) and the processing region (53; 153).

11. The processing station as defined by claim 1, wherein one component selected from the group consisting of the withdrawable module (14; 114) and the module platform (12; 112), includes at least one male electrical plug, and the respective other component includes at least one female electrical plug for connection to the at least one male electrical plug, in order to transmit a parameter selected from the group consisting of electrical energy, electrical signals, and both, between the withdrawable module (14; 114) and the module platform (12; 112).

12. The processing station as defined by claim 11, wherein at least one plug connection element selected from the group comprising a male electrical plug, a female electrical plug, a male pneumatric plug, and a female pneumatric plug, is connected to the withdrawable module (114) via a flexible cord.

13. The processing station as defined by claim 11, wherein one component selected from the group consisting of the withdrawable module (14; 114) and the module platform (12; 112), has a hybrid male plug (47) with at least one male electrical plug and at least one male pneumatic plug, and the respective other component has a hybrid female plug with at least one female electrical plug and at least one female pneumatric plug.

14. The processing station as defined by claim 11, wherein the electrical signals transmitted between the withdrawable module (14; 114) and the module platform (12; 112) are selected from the group consisting of electrical status signals, control commands, and both.

15. The processing station as defined by claim 1, wherein one component selected from the group consisting of the withdrawable module (14; 114) and the module platform (12; 112), includes at least one male pneumatric plug, and the respective other component includes at least one female pneumatric plug for connection to the at least one male pneumatric plug, in order to transmit compressed air between the withdrawable module (14; 114) and the module platform (12; 112).

16. The processing station as defined by claim 1, wherein the withdrawable module (14; 114) has a control housing (36; 136) for receiving control units (64) for controlling the processing and/or handling devices.

17. The processing station as defined by claim 1, wherein a transportation path (40, 42; 140, 142) has a unit selected from the group consisting of one conveyor belt or two conveyor belts (54), spaced apart from one another orthogonally to the respective transporting direction, and one control command and one passive conveyor device, such as a transportation roller path, spaced apart from the control command and orthogonal to the respective transporting direction.

18. The processing station as defined by claim 1, wherein the module platform (112) has module receptacles (118) of variable size.

19. A withdrawable module for a processing station in accordance with the characteristics pertaining to the withdrawable modules of claim 1.

20. A processing station for a processing line, comprising a module platform (12; 112) and a plurality of withdrawable modules (14; 114) that can be introduced into it, and the processing station (10; 110) has a transporting device (40, 42; 140, 142) for transporting workpieces (56; 156) to be processed at the processing station (10; 110),
  wherein the transporting device (40, 42; 140, 142) includes a plurality of part-transporting devices (43; 143), wherein one part-transporting device (43/143) is associated with each withdrawable module (14; 114) and is solidly connected to the withdrawable module (14; 114); the part-transporting device is capable of being introduced jointly with the withdrawable module into the module platform (12; 112), and wherein the part-transporting device (43/143) of at least some of the withdrawable modules (14; 114) has a first transportation path (40; 140), which is embodied for transporting a workpiece (56; 156) essentially over the width of the withdrawable module (14; 114) in a first transporting direction (T1), wherein the withdrawable module (14; 114) has a processing nest (48; 148) and a process relocating device (44) which is embodied for relocating a workpiece (56; 156) between the first transportation path (40; 140) and the processing nest (48; 148); wherein the first transportation path (40; 140) and the process relocating device (44) are combined in a preassembled structural unit (50); and wherein the preassembled structural unit (50) also includes the processing nest (48; 148).

21. A processing station for a processing line, comprising a module platform (12; 112) and a plurality of withdrawable modules (14; 114) that can be introduced into it, and the processing station (10; 110) has a transporting device (40, 42; 140, 142) for transporting workpieces (56; 156) to be processed at the processing station (10; 110),
  wherein the transporting device (40, 42; 140, 142) includes a plurality of part-transporting devices (43; 143), wherein one part-transporting device (43/143) is associated with each withdrawable module (14; 114) and is solidly connected to the withdrawable module (14; 114); the part-transporting device is capable of being introduced jointly with the withdrawable module into the module platform (12; 112), and wherein the part-transporting device (43/143) of at least some of the withdrawable modules (14; 114) has a first transportation path (40; 140), which is embodied for transporting a workpiece (56; 156) essentially over the width of the withdrawable module (14; 114) in a first transporting direction (T1), wherein the withdrawable module (14; 114) has a processing nest (48; 148) and a process relocating device (44) which is embodied for relocating a workpiece (56; 156) between the first transportation path (40; 140) and the processing nest (48; 148); wherein the first transportation path (40; 140) and the process relocating device (44) are combined in a preassembled structural unit (50); and wherein the preassembled structural unit (50) also includes the transportation path relocating device (46).

22. A processing station for a processing line, comprising a module platform (12; 112) and a plurality of withdrawable modules (14; 114) that can be introduced into it, and the processing station (10; 110) has a transporting device (40, 42; 140, 142) for transporting workpieces (56; 156) to be processed at the processing station (10; 110),
  wherein the transporting device (40, 42; 140, 142) includes a plurality of part-transporting devices (43; 143), wherein one part-transporting device 43/143 is associated with each withdrawable module (14; 114) and is solidly connected to the withdrawable module (14; 114); the part-transporting device is capable of being introduced jointly with the withdrawable module into the module platform (12; 112), and wherein the part-transporting device (43/143) of at least some of the withdrawable modules (14; 114) has a first transportation path (40; 140), which is embodied for transporting a workpiece (56; 156) essentially over the width of the withdrawable module (14; 114) in a first transporting direction (T1),
  wherein the withdrawable module (14; 114) includes a valve assembly (38; 138) with a plurality of pneumatic switching valves.

23. The processing station as defined by claim 22, wherein at least one transportation path (40, 42; 140, 142) is located between the valve assembly (38; 138) and the processing region (53; 153).

24. A processing station for a processing line, comprising a module platform (12; 112) and a plurality of withdrawable modules (14; 114) that can be introduced into it, and the processing station (10; 110) has a transporting device (40, 42; 140, 142) for transporting workpieces (56; 156) to be processed at the processing station (10; 110),
  wherein the transporting device (40, 42; 140, 142) includes a plurality of part-transporting devices (43; 143), wherein one part-transporting device (43/143) is associated with each withdrawable module (14; 114) and is solidly connected to the withdrawable module (14; 114); the part-transporting device is capable of being introduced jointly with the withdrawable module into the module platform (12; 112), and wherein the part-transporting device (43/143) of at least some of the withdrawable modules (14; 114) has a first transportation path (40; 140), which is embodied for transporting a workpiece (56; 156) essentially over the width of the withdrawable module (14; 114) in a first transporting direction (T1),
  wherein the withdrawable module (14; 114) has a processing nest (48; 148) and a process relocating device (44) which is embodied for relocating a workpiece (56; 156) between the first transportation path (40; 140) and the processing nest (48; 148), and
  wherein the process relocating device (44) is embodied for holding a workpiece (56; 156) in the processing nest (48; 148) in such a manner that a further workpiece on the first transportation path (40; 140) is capable of passing the processing nest (48; 148) with the workpiece retained in that nest.

25. The processing station as defined by claim 24, wherein the process relocating device (44) includes a lifting/pivoting device for raising a workpiece (56; 156) in one position out of the first transportation path (40; 140) and pivoting it by 180° into a second position towards the processing nest (48; 148).

26. The processing station as defined by claim 25, wherein the process relocating device (44) includes two lifting devices (72, 74), which are actuatable separately from one another, and of which when the process relocating device (44) is not in motion one lifting device (72 or 74) is assigned one position out of the first transportation path (40) and the processing nest (48), and the other lifting device (74 or 72) is assigned the respective other position.

27. The processing station as defined by claim 26, wherein the tool lifting devices are reciprocating pistons.

* * * * *